(12) United States Patent
Alcalde et al.

(10) Patent No.: US 7,081,579 B2
(45) Date of Patent: Jul. 25, 2006

(54) METHOD AND SYSTEM FOR MUSIC RECOMMENDATION

(75) Inventors: Vicenç Gaitan Alcalde, Castellà del Vàlles (ES); Carlos María López Ullod, Saragossa (ES); Antonio Trias Bonet, Sant Cugat del Valles (ES); Antonio Trias Llopis, San Cugat del Valles (ES); Jesús Sanz Marcos, Barcelona (ES); Daniel Caldentey Ysern, Barcelona (ES); Dominic Arkwright, Barcelona (ES)

(73) Assignee: Polyphonic Human Media Interface, S.L., Barcelona (ES)

( * ) Notice: Subject to any disclaimer, the term of this patent is extended or adjusted under 35 U.S.C. 154(b) by 98 days.

(21) Appl. No.: 10/678,505

(22) Filed: Oct. 3, 2003

(65) Prior Publication Data
US 2004/0107821 A1   Jun. 10, 2004

Related U.S. Application Data

(60) Provisional application No. 60/415,868, filed on Oct. 3, 2002.

(51) Int. Cl.
*G10H 7/00* (2006.01)

(52) U.S. Cl. .......................................... 84/608; 700/94
(58) Field of Classification Search .......... 84/604–609, 84/623, 626, 660, 661, 693, 697–699; 708/403; 707/1; 700/94; 705/10; 713/176; 434/307 A
See application file for complete search history.

(56) References Cited

U.S. PATENT DOCUMENTS

| | | | |
|---|---|---|---|
| 5,616,876 A | 4/1997 | Cluts | 84/609 |
| 5,792,971 A | 8/1998 | Timis et al. | 84/609 |
| 5,918,223 A * | 6/1999 | Blum et al. | 707/1 |
| 6,284,964 B1 | 9/2001 | Suzuki et al. | 84/626 |
| 2002/0002899 A1 | 1/2002 | Gjerdingen et al. | 84/667 |
| 2002/0147628 A1* | 10/2002 | Specter et al. | 705/10 |
| 2003/0045953 A1* | 3/2003 | Weare | 700/94 |
| 2004/0039913 A1* | 2/2004 | Kruse | 713/176 |

* cited by examiner

*Primary Examiner*—Marlon T. Fletcher
*Assistant Examiner*—Jianchun Qin
(74) *Attorney, Agent, or Firm*—Whiteford, Taylor & Preston; Jeffrey C. Maynard; Gregory M. Stone

(57) ABSTRACT

An artificial intelligence song/music recommendation system and method is provided that allows music shoppers to discover new music. The system and method accomplish these tasks by analyzing a database of music in order to identify key similarities between different pieces of music, and then recommends pieces of music to a user depending upon their music preferences. An embodiment enables a user to evaluate a new song's similarity to songs already established as commercially valuable.

20 Claims, 5 Drawing Sheets

METHOD AND SYSTEM FOR MUSIC RECOMMENDATION

CROSS REFERENCE TO RELATED APPLICATION

This application is based upon and claims benefit of copending and co-owned U.S. Provisional Patent Application Ser. No. 60/415,868 entitled "Method and System for Music Recommendation", filed with the U.S. Patent and Trademark Office on Oct. 3, 2002 by the inventors herein, the specification of which is incorporated herein by reference.

BACKGROUND OF THE INVENTION

1. Field of the Invention

The invention disclosed herein relates generally to methods and systems for analyzing and using digital music compositions, and more particularly to a method and system for determining the characteristics of a musical composition by analyzing its digital composition, and recommending particular musical compositions to users based upon the relative comparability of a user's desired musical characteristics and the musical characteristics of a collection of digital music.

2. Background of the Invention

Historically, what is pleasing to the human ear has not changed since man began making sounds. Patterns in music that are pleasing to the human ear have not changed much, if at all, since the times of the classical composers. What has changed are styles, performances, the instruments used, and the way music is produced and recorded, but a compelling melody is still compelling and a series of random notes still sounds random. For example, the dictionary describes melody as a series of notes strung together in a meaningful sequence. Unfortunately, some sequences sound meaningful and make up a beautiful song and other sequences just sound like noise.

While the number of possible melody patterns combined with all of the other variables in recorded music allow for a seemingly infinite number of combinations, the patterns that we find pleasing have not changed. That is not to say everything has been invented, however. So far, every new style of music that has come into being: country, rock, punk, grunge etc. have all had similar mathematical patterns. The hits in those genres have all come from the same 'hit' clusters that exist today and anything that has fallen outside of such 'hit' clusters has rarely been successfully on the charts for its musical qualities.

SUMMARY OF THE INVENTION

It is an object of the present invention to provide a method and system for measuring the characteristics of a musical composition, and establishing a collection of digital musical compositions that may be sorted based upon such characteristics.

It is another object of the present invention to provide a method and system for determining a preferred musical characteristic profile for a music listener.

It is another object of the present invention to enable a method and system to compare new digital music files with historical commercially successful songs.

In accordance with the above objects, an artificial intelligence song/music recommendation system and method is provided that allows music shoppers to discover new music. The system and method accomplish these tasks by analyzing a database of music in order to identify key similarities between different pieces of music, and then recommends pieces of music to a user depending upon their music preferences.

In an alternate embodiment, a system and method is provided to compare specific new songs to a database of music to establish a score according to the new song's similarities with current 'hit' songs. A user can provide a digital music file of an original song that can be analyzed and compared to a 'hit' song database. The system provides a numerical score depending upon mathematical similarities to songs in the current 'hit' song database.

To provide users with music recommendations, the system employs a number of analysis functions. First, a "Music Taste Test" function learns a user's music preferences via a series of binary choice questions, and delivers lists and/or personalized song recommendations to the user based on this information. Recommendations are prioritized and listed in order of closest song match on a theoretical multi-dimensional grid. Next, a "More Like This" contextual matching function delivers song recommendations to the user based on a specific song as the defined starting point, and delivers songs that are most similar. Lastly, a "My Personal Preferences" taste matching function allows the user to select and rate songs from the overall database of songs in the system, and personalized recommendations are received based on the personalized ratings.

To provide users with an analysis of an original song, the system analyzes a music data file with extra parameters relating to commercial success of the music in the database. Using this extra dimension, new songs can be compared with the database to see how well such new song fits into the current market and to identify potential hits.

DESCRIPTION OF THE DRAWINGS

Other objects, features, and advantages of the present invention will become more apparent from the following detailed description of the preferred embodiments and certain modifications thereof when taken together with the accompanying drawings, in which.

DETAILED DESCRIPTION OF THE PREFERRED EMBODIMENTS

Figure 1:
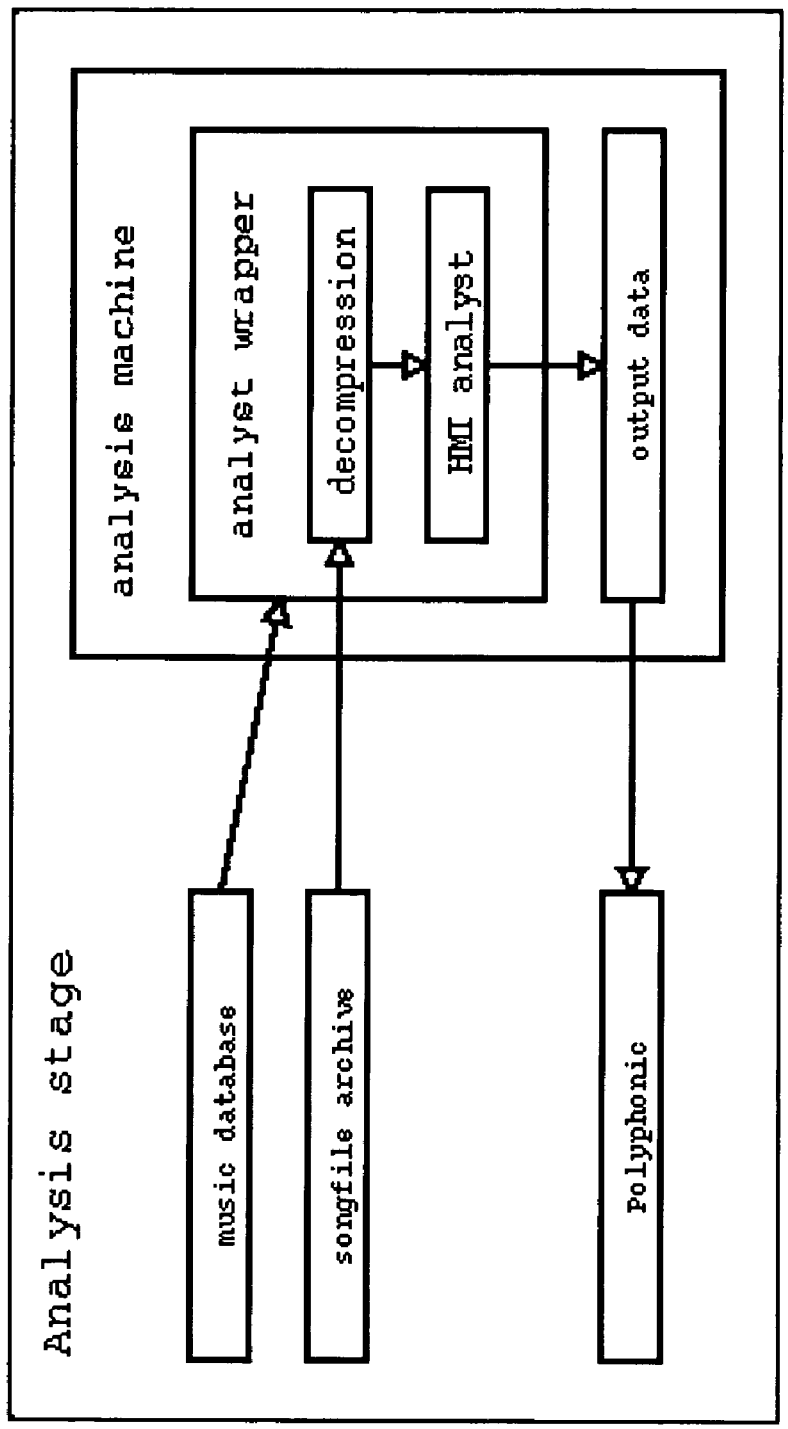
FIG. 1 is a schematic view of a system architecture for the system of the instant invention.

The invention summarized above and defined by the enumerated claims may be better understood by referring to the following description, which should be read in conjunction with the accompanying drawings. This description of an embodiment, set out below to enable one to build and use an implementation of the invention, is not intended to limit the enumerated claims, but to serve as particular examples thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The method and system of the instant invention enable the analysis and processing of digital music in order to establish a description of a number of characteristics of the music, and likewise enable recommending a collection of music having particular characteristics to a user who has established a desired musical characteristic profile. In an alternate embodiment, the method and system of the instant invention enable identification of new songs that have similar characteristics with songs already established as commercial successes.

The first step performed by the system is to analyze an existing digital music file in order to create a descriptive profile for the musical characteristics of the song. Preferably, a database containing a library of digital music is provided. Such music database may be a part of the system employing the other functions described herein, or may be a remote resource that is maintained by a third party digital music company through remote, secure access. Access to such a third party digital music library may be provided, assigned, and protected under terms established by the particular third party database provider using known technology.

Whether provided as an element of the analysis and recommendation system or as a third party remote resource, the database preferably includes digital music files formatted as uncompressed linear PCM ("Pulse Code Modulation") audio data. If stored in the database in a compressed format, the digital music files are decompressed using a standard tool for the compression scheme in use. The database may be modified, such as by adding additional digital music files to the database on a regular, periodic basis, such as weekly or monthly, to fit the particular business needs and objectives of the database provider. New analysis (as described herein) may also be done on a periodic basis similar to database updates, such that new music provided to the database may be included in the music recommendation functions described herein. Any newly generated analysis data from newly added digital music files is simply added at the end of the analysis data file, which is described in greater detail below.

FIG. 1 depicts a schematic view of a system architecture for enabling the transfer and processing of digital music files to an automated digital music file analysis tool in order to generate an output file that, as described in greater detail below, serves as a descriptor of the musical characteristics of the particular musical composition that was analyzed. As shown in FIG. 1, an "analyst wrapper" script receives digital music files from the music database or a song file archive, preferably copies the particular digital music file to a location on a computer network on which the analysis system is stored, decompresses the digital music file when necessary, and passes the linear PCM file to the analysis engine for processing. (In FIG. 1, the analysis engine is labeled "HMI analyst" for Human Media Interface.) The output of such analysis engine is directed to an output text file that, in turn, may be used by the recommendation utilities described below.

During the initial analysis performed by the system, all songs that are to be analyzed are processed in the same way, in series. The particular list of songs to be processed may vary depending upon the application. For instance, for a particular retailer, only their music catalogue is analyzed. For a generalized music recommendation system, all songs available in the digital music database are analyzed. The purpose of the initial analysis performed by the system is to analyze a variety of physical parameters of the music stored in the target digital music database. Such physical parameters describe quantifiable characteristics of music that may be mathematically modeled to create a descriptive, electronic "footprint" for each song. Moreover, the analyzed parameters are based on human perception, and the system is referred to as a Human Media Interface (HMI) system. The characteristics have been identified to be the ones that produced the strongest reaction in testers. Often the listener detects the characteristics unconsciously. In general, the mix of parameters is more important than any individual parameter. To implement the methods described herein, the system particularly analyzes one or more of the following characteristics for each musical composition: brightness, bandwidth, volume, tempo, rhythm, low frequency, noise, octave, and how these characteristics change over time, as well as length of the audio data. Not all of the characteristics necessarily provide distinctions in the music. Combinations of some or all of these characteristics may be employed without departing from the spirit and scope of the instant invention.

In order to measure each of these characteristics, the digital music file is divided into "chunks" which are separately processed in order to measure the characteristics for each such "chunk." "Chunk" size is fixed and selected for optimizing performance over a test sample of songs so as to provide an appropriately representative sample for each parameter of interest. Once the data from the digital music file is divided into such "chunks," the value for each parameter in each chunk is measured. Parameters are measured over all "chunks" and averaged. The values that are derived through such measurements are, as described in greater detail below, used, in turn, to establish mean values and standard deviations among the parameter data so as to develop a profile for the entire song file.

In order to measure the parameters noted above, the data from the digital music file is decomposed using Fast Fourier Transform (FFT) techniques. The Fourier transform, in essence, decomposes or separates a waveform or function into FFT coefficients of different frequency that sum to the original waveform. The Fourier transform identifies or distinguishes the different frequency FFT coefficients and their respective amplitudes. Specific details concerning the application of FFT techniques can be found in P. Duhamel and M. Vetterli, *Fast Fourier Transforms: A Tutorial Review And A State Of The Art*, Chapter 19: Signal Processing, pp. 259–299 (Elsevier Science Publishers B.V. 1990), which is incorporated herein by reference thereto.

Using such FFT techniques, each digital music file is decomposed into a defined set of FFT coefficients, which are grouped and separated in order to determine the different parameters to be calculated for each song. To accomplish this task, raw data, in the form of the digital music file in PCM format, is directed to a script that decompresses the file (where necessary), divides the data into "chunks," and applies FFT techniques to the data in each "chunk" to, in turn, establish the FFT coefficients for each "chunk." Once those coefficients are established for each "chunk," particular coefficients are chosen in order to calculate a numerical value for each of the parameters of interest in each "chunk." More particularly, the specific parameters for each chunk are calculated, using the FFT coefficients, based on the following principles:

Brightness is quantified as a spectral histogram built from the FFT.

Bandwidth is quantified as the variance of the spectral histogram built from the FFT.

Tempo is quantified as a measure obtained using a "Beat Tracker" algorithm (based upon autocorrelation values). The Beat tracker algorithm calculates how many beats per second are in a "chunk."

Volume is quantified as the average change in the bit sample amplitudes at lag 1. Lag 1 refers to consecutive beats.

Low Frequency is quantified as spectral power weighted with ten inverse frequency.

Noise is quantified as the sum of all the FFT coefficients normalized to the maximum FFT coefficient.

Octave is quantified as the temporal mean of Cepstrum (inverse of the logarithmic FFT). The Octave is calculated for each chunk and averaged.

File Size is quantified as the number of bytes of the file.

In other words, FFT coefficients provide data needed to calculate all the parameters listed, except for file size. Thus, the result of the analysis of the data from the digital music file is several parameter values based on the number of particular "chunks." In order to derive a final parameter value for the song as a whole, the mean is taken from all "chunks" within the same parameter.

Compiling each value for all the parameters measured results in an output that is referred to herein as a "parameter vector," which parameter vector is formatted as a text file (with values separated by semicolons). An exemplary parameter vector may appear as follows:

78221904926; 1; 01; 41.018945; 26.088065; 38.450639; 23.616234; 5337.3284; 266.848675; 118.7692; 76.484095; 116.6154; 73.836892; 0.00007

Note: The actual ordering of values in the set is immaterial so long as it is known and consistent.

The bold section of the sample parameter vector noted above is an example of song identification information, including the UPC, disk number, and track number. The other data is sample parameter value information (e.g., tempo, volume, etc.). Based upon the particular database, other generally available information may optionally be provided and may be useful in the music recommendation functions described in greater detail below. Such other information may include, by way of example: (i) retailer/store-specific media identification; (ii) set count (number of disks in set); (iii) album title; (iv) artist name; (v) music genre; (vi) record label; (vii) track title; (viii) track artist; (ix) track duration; and (x) copyright date.

The system will recognize almost all values for any parameter as valid, except negative values. If negative values are found, it means that the digital music file is invalid, and the data needs to be manually discarded. Further, if values are consistently too high, there is the possibility of damaged data or data stemming from an invalid file. Negative and "too high" parameters correspond to out layers in the standardized distribution of frequencies of each parameter. The cut-offs are defined over a number of standard deviations calculated in a test sample of songs. The analysis tool analyzes files assuming that they are standard digital music files and assumes all data is valid (unless negative values are found). Such digital music files are typically identified with the filename extension.wav(.) The analysis tool reads audio waves of a song and performs algorithmic analyses of certain subjective criteria, as described above.

Once the parameter vector for the entire song has been established as set forth above, standard mathematical analysis is used to extract samples of the most representative passages of the music. More particularly, the analysis tool divides the entire song into small sections (on the order of several seconds, depending upon the precision required), and calculates all of the parameter values for each of those sections using the same FFT analysis methods set forth above. The resulting parameter vectors thus represent the instantaneous value for all of the parameters at the particular song position specified by each section. When such section processing is completed, a parameter vector exists for each section.

Following section processing, the system then proceeds to find the most representative passage (whose length varies depending upon the application) of the song. First, each parameter vector for each section is compared to the parameter vector derived from the analysis of the entire song. The closest section's parameter vector is chosen as the most representative part of the song. "Closest" is defined in terms of unweighted quadratic differences between each section and the whole song. The parameters are already "equalized" by the standardization procedure. Once the most representative part of the song is determined, the system produces a song clip that includes that most representative part. In order to create a clip of a particular desired length (X), the system subtracts X/2 seconds from the position of the most representative section's position in order to obtain a clip of length X having the most representative part in the middle of the clip.

Figure 2:
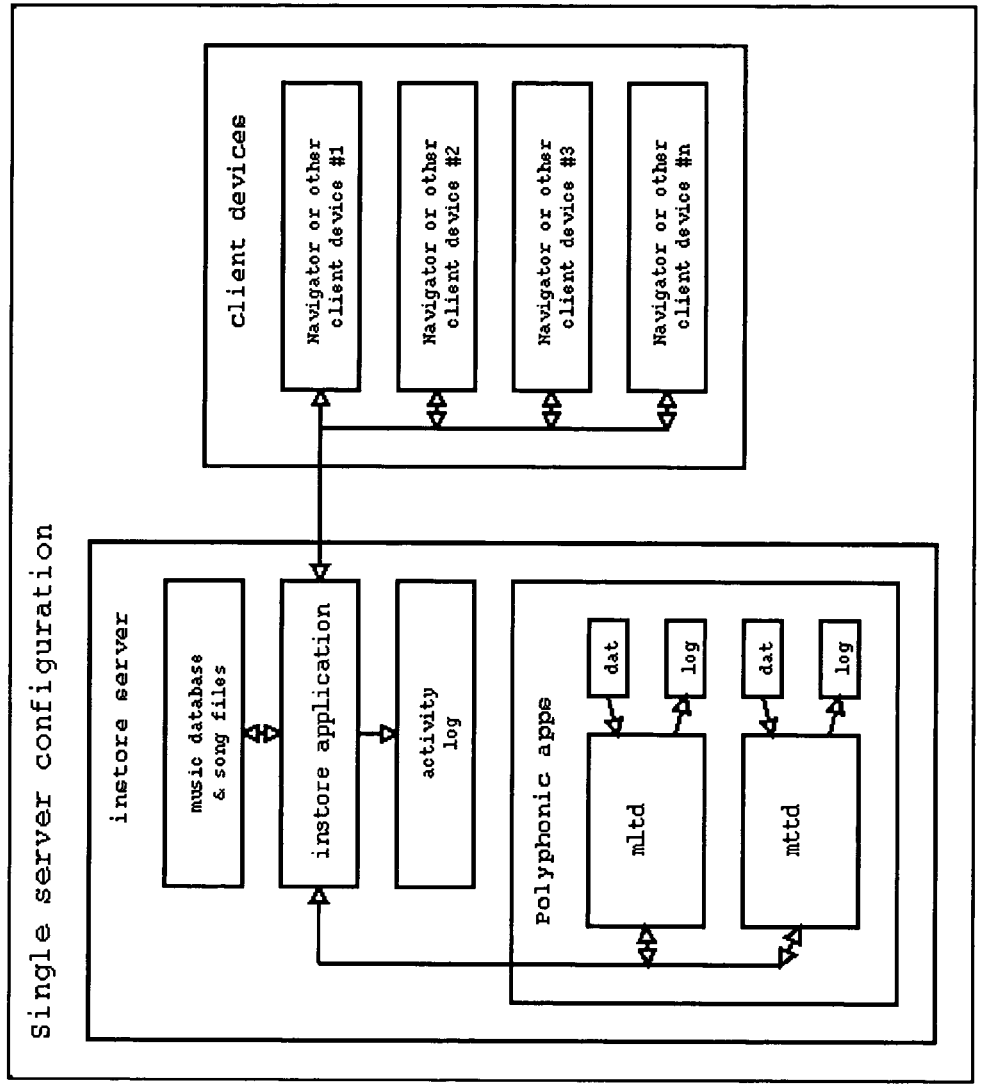
FIG. 2 is an exemplary single server configuration using the system of the instant invention.
Figure 3:
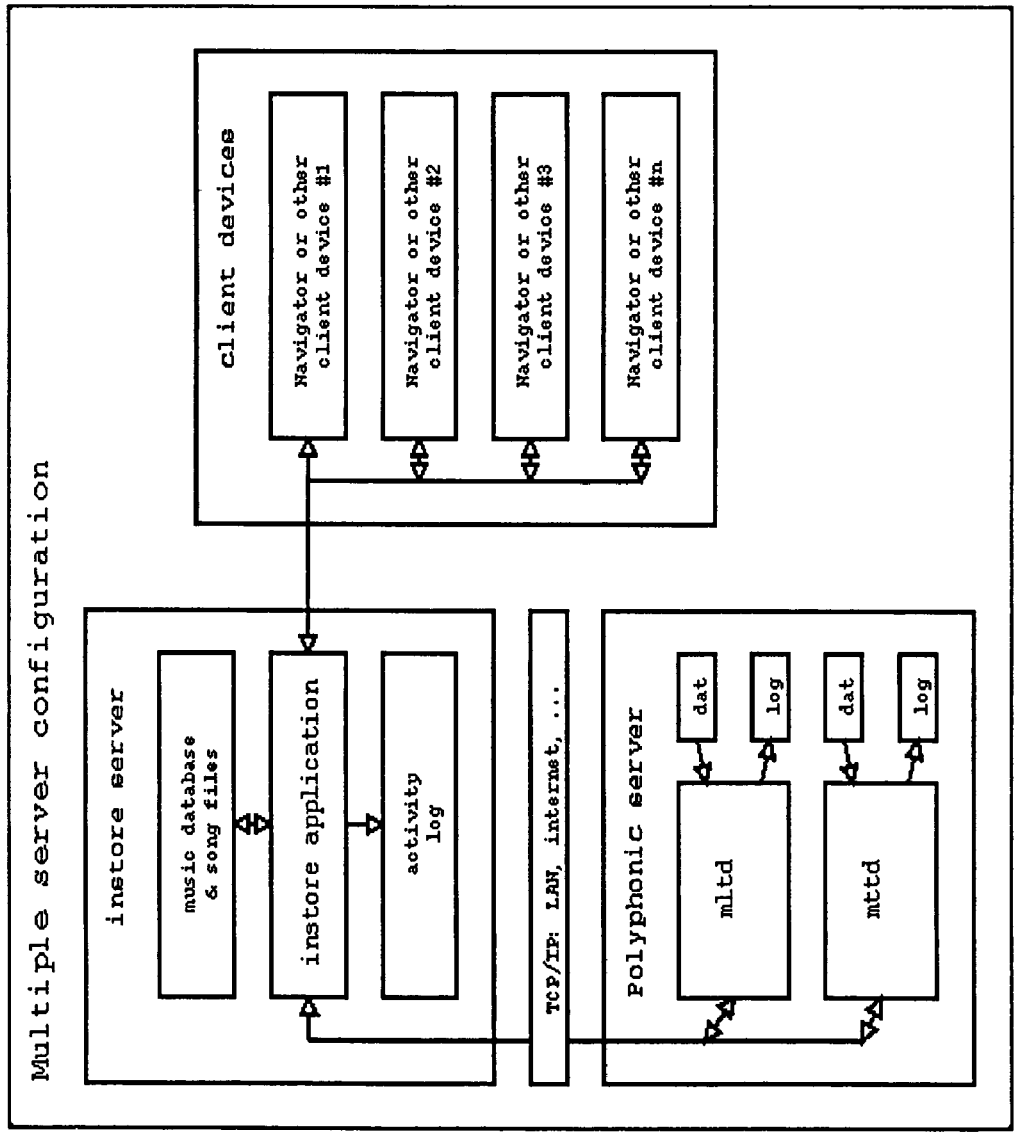
FIG. 3 is an exemplary multiple server configuration using the system of the instant invention.

The output from the analysis process described above for the complete song is stored in a plain text format, tab-delimited. The next step following analysis and profiling of the library of songs is to provide a recommendation engine to enable the system to recommend songs to particular users based upon the musical characteristics of the songs as depicted by their parameter vectors. It should be noted that such recommendation functionality may be provided as an "in store" application running on the same server as the analysis component; on a server at the same location as the database of song parameter vectors, as illustrated in FIG. 2; on a remote server in communication with an application server at a retail location across a TCP/IP connection, as illustrated in FIG. 3; or the like. In each instance, the recommendation engine loads the parameter vector file, and is configured to particularly deal with the text format of the parameter vector file. The text data of the parameter vector file may be loaded during the recommendation engine startup by specifying so on the command line, or a command may be sent after startup to locate and load the data.

Following the loading of the text data of the parameter vector to the recommendation engine, various mathematical and statistical procedures (discussed in detail below) are run on the loaded data to ensure that all of the data is meaningful, and to extract the essential characteristics from each song and its preferences profile. Such preferences profile is the parameter vector described above, after normalization has been performed based on the whole song analysis database (and is generated and formatted in the same manner).

Some statistical methods are used to improve the quality of the analysis information and subsequent Artificial Intelligence techniques. Data is normalized and centered by the system using Zero Mean Data and Standard Deviation Equal to Variance Equal to 1 for each parameter separately. More particularly, in applying Zero Mean Data, the mean value for each of the parameters is calculated across the entire song database, and the individual parameters of individual songs are then centered using those means. In other words, the parameter values for each song are changed by subtracting the calculated mean for each parameter by the original parameter value of the song. Thus, if the mean was recalculated with these new values, the mean value would be zero. Further, standard deviation and variance are correlated, as variance equals the square of the standard deviation. In applying Standard Deviation Equal to Variance Equal to 1, the data is normalized using standard deviation equal to 1. To do this, the system calculates the standard deviation and the variance for the set, and then, changing all of the values for the set (dividing the Zero Mean Data already calculated by the variance of the set) in order to get standard deviation equal to 1 if it was recalculated using these new values.

With centered and normalized data, correlations between all analysis parameters are identified and eliminated to reduce redundant information given by different parameters and getting the most unique information from each parameter. To do this, the system creates a new set of parameters with no correlations, but with all the information included in the parameters analyzed by the analysis tool. These new parameters have no conceptual meaning (i.e., they are referred to as parameter1, parameter2, etc., instead of "volume," "tempo," etc.).

Data correlations are determined using a standard correlation matrix. The standard correlation matrix formula is as follows:

$$V_{ij} = \frac{1}{M} \sum_{c=1}^{M} Z_i(c) Z_j(c)$$

$V_{ij}$ is the value of the intersection of column i and row j

M is the number of songs in the database c is each particular song $Z_i$ and $Z_j$ are parameter number i and j respectively for each song c In essence, the correlation matrix multiplies, for each pair of parameters, all values for all registers of data, adding them, and then dividing by the total number of registers.

The correlation matrix is then used to calculate Eigenvectors and Eigenvalues. As the correlation matrix is symmetric, standard Jacobi transformations (of symmetric matrices) are used to compute all Eigenvectors and Eigenvalues. Eigenvectors and Eigenvalues are standard statistical formulae used to determine and eliminate correlations between parameters, thereby reducing repeated information and increasing data utility.

Eigenvectors are important in determining the new uncorrelated parameters from the original parameters, as illustrated in the following formula:

$$[P_1 \ P_2 \ \cdots \ P_N] = [O_1 \ O_2 \ \cdots \ O_N] \times \begin{bmatrix} E_{11} & E_{12} & \cdots & E_{1N} \\ E_{21} & E_{22} & \cdots & E_{2N} \\ \cdots & & & \cdots \\ E_{N1} & E_{N2} & \cdots & E_{NN} \end{bmatrix}$$

$P_i$ (where i goes from 1 to N) are the new parameter values for each song

N is the number of parameters, and also, the number of eigenvectors $O_i$ (where i goes from 1 to N) are the original parameter values for each song $E_{ij}$ (where i and j go from 1 to N) are the values for parameter j of Eigenvector i Eigenvalues give the amount of uncorrelated information contained in each parameter. Thus, these values are used to weight the importance of parameters (or even discard parameters that contain no or almost no information).

Depending on precision and speed desired, weighting and discarding rules are set for each customer. Weights for various parameters are session-dependent and user-dependent. For example, in a three parameters example, the parameters $P_1$, $P_2$ and $P_3$ contain 75%, 23%, and 2% of the total amount of information, respectively. Depending on the specific customer needs (speed, accuracy, simplicity, etc.) the following weighting rules can be applied:

Keep all parameters equally weighted (33.33%, 33.33%, and 33.33%)

Weight all parameters based on the percentages above (75%, 23%, and 2%)

Discard the last parameter and weight the remaining two as $P_1$ 77% and $P_2$ 23%

Discard the last parameter and equally weight the remaining two (50%, 50%)

Etc.

The parameters are now uncorrelated, normalized, and orthogonal and weights have been set for each one, so the system can get maximum value from them. These new parameters replace, in the system, the old ones that came from the music analysis tool.

Standard clustering algorithms are then employed by the system to locate and determine clusters within the entire database for further usage (specific to music recommendation functions "More Like This" and "My Personal Preferences," described in greater detail below).

After a large selection of music has been analyzed and the data has been uncorrelated, normalized, orthogonal, and weights are set, the system may provide a variety of music recommendation functions through interaction with a user. There are two keys ways to recommend music to an individual user. One method is to capture a user's own personal taste profile by enabling them to take a "music taste test". In this process, the user is presented with a number of binary choices between two short audio clips and chooses the clip they prefer. After a series of comparisons, it is possible to generate a profile for that user; the profile is analogous to a song's own profile, as measured in the analysis phase. In this way, songs from the database that share commonalities to the user profile can be identified and presented to the user to preview. The second way simply links a song or a group of songs to a selection of music that has a similar profile. This technique takes the individual profile of the song or songs and matches it to the whole catalogue of music in the database.

In order to initiate the music recommendation features, a user interacts with a computer, website, interactive kiosk, in-store listening station (like those commercially available from ACD, Fullplay, Black Box AV, First Universal, and RedDotNet), or other computer-like device in which the recommendation functions are loaded. In FIGS. 2 and 3, user interaction takes place at one of the client devices, as shown. The recommendation software can be loaded directly to the computer/device/server, as shown in the single server configuration of FIG. 2. In other embodiments, the recommendation software can be served remotely through a LAN, WAN, or via an ASP environment, as shown in the multiple server configuration of FIG. 3.

Irrespective of the locality of the software, the music recommendation functions are preferably executed as a series of requests and responses handled by a daemon (or service) on a server. The daemon listens for requests to its network address on a specific port, and communicates with client devices using its own protocol, referred to herein as Simple HMI-Music Protocol (SHMP). SHMP is a protocol designed to satisfy the functionality given by the system over any TCP/IP network, and is used to send and receive a variety of requests, including, but not exclusive to, "Music Taste Test Request" and "More Like This Song," as described in greater detail below.

A "Music Taste Test" ("MTT") is used to determine a user's music preferences, and thereby make personalized song recommendations. The MTT function is implemented through a pattern-recognizing artificial intelligence system using an MTT daemon (labeled 'mttd' in FIGS. 2 and 3). The MTT function creates simple questions and instructions that prompt a user to listen to a series of two short music clips and make a choice on which music clips he/she prefers between the two choices. The first two clips are initially selected at random to maximize the dissimilarity in the parameters corresponding to each song. Subsequent selections are performed by using the Eigenvector algorithm, maximizing the information given by the selection. The Eigenvector algorithm eliminates correlated data that cannot be used to distinguish between the two songs. For example, if the numerical value for a selected parameter is substantially the same in the two songs, selection of either song by the user as being preferred is likely not due to the selected parameter. The system recognizes which parameter(s) provide distinguishing characteristics and uses the user input to select another two choices in order to capture the taste of the user regarding all of the variable parameters.

The sequence of binary choices is repeated until the MTT successfully defines preferred values for each parameter or if the system is prompted to give recommendations. Since the system learns from every user response, it can recommend appropriate songs at any point in the test with the information it has learned. In order to do this, the MTT function asks questions based upon the different parameters and decreases the size of the preferred subset according to the songs chosen by the user. Essentially, the system provides the representative clip from two songs previously analyzed and asks the user to select which song the user prefers. By asking binary questions, the system finds the preferred values for each one of the song parameters analyzed.

As the subset gets smaller, the preferred range for each parameter gets smaller too and, at some point, the user will not be able to distinguish between the two extremes of the parameter for the range found in the subset. In other words, the user will equally like songs from the whole range. The system is able to tell the user's perception level for each parameter and determine that the system cannot learn any more from the user. The MTT function identifies that it has reached this point for a parameter when the user chooses songs indistinctly from both extremes of the subset's range, and so there is no determined consistency in the answers. The MTT function will never have a 100% confidence level for a user (as long as there remain songs in the database); thus, in reality, a new pair of songs can always be requested.

In theory, the MTT function's learning process seeks to achieve the highest possible confidence level for all parameters, in essence achieving a high confidence level for the user's preferences. In other words, the system seeks to reach a high confidence level for each user and develops a precise taste profile for each user (based on the parameters analyzed). In reality, however, this process can continue endlessly, as the MTT function seeks to shorten preferred ranges and modify preferred values. For commercial applications, it is necessary to set a limit on the MTT process. This limit can be set either by setting a limited number of sound clip comparisons, target confidence level, or both. This is a matter of simple programming on the front-end application on the customer's side.

A user's profile is stored in the system while the user is still connected to the system. When the session is terminated, the user profile is eliminated. However, this profile can also be saved within the system or external database and accessed at a later date, depending upon the specific retail customer and implementation environment. Thus, a user can go back, continue the MTT process, and obtain refined recommendations. This functionality is achieved using an identification technology such as loyalty cards or cookies, as described in greater detail below.

The MTT process in a retail situation is adapted to require approximately 8–15 steps to complete the taste test determination process. A progress meter is optionally displayed on the user's screen reflecting the confidence level of the system, thereby allowing users to understand where they are in the test process.

The typical user interface includes two basic "play buttons" which allow the user to first preview both music clips (multiple times, if they desire), and two basic "select buttons" which then allow the user to select which of the two music clips they prefer. There is no qualitative aspect to these choices; rather, the user simply decides which song is preferred between the two music clips. The music clips used in the MTT process are unique audio files, derived from the clip extraction phase described in detail above.

The MTT user interface may vary based on implementation environments and operating systems. In fact, the MTT functionality is independent of the user interface as long as the user is presented with the two songs and is able to choose the one that he/she prefers. For example, a user interface could consist of two songs displayed as text and then the user is prompted to type the name of his preferred song, the MTT function will continue to function the same. Furthermore, the interface can be customized to meet the specific needs/requirements of different customers. This includes adding a customer's logo, color scheme, wording/tonality, and audio cues.

Once the MTT function has been completed, the user's particular musical tastes are established in the user's personal 'taste' vector. The system uses the 'taste' vector to determine and display a list of song matches to the user's determined musical taste. Alternately, the list of song matches may be displayed to the user at his or her request before completion of the analysis, in which case the recommendations will simply reflect the MTT function's current confidence level. To generate the list of song matches, the MTT function searches the music database in order to find songs that most closely match that user's 'taste' profile. Closeness of a song to the 'taste' vector is determined by the mathematical distance between two songs.

The theory of the recommendation engine is based upon the relative correlation between a user's preferred values and each song (where correlation is defined as the relative distance measured as the sum of the squared difference between each parameter). A song is always considered as a whole and, thus, individual parameters are not considered to be matches by themselves. This formula can be illustrated as follows:

$$C = \sum_{p=1}^{N} (Sp - Vp)^2$$

where C is the proximity value between the song and the user's preferred values, N is the number of parameters in the parameter vector, S is the parameter vector of the songs in the database, and V is the parameter vector with the user's preferred values. These results can be customized and displayed according to closest match, genre, or release date. Theoretically, only songs with a value of C below a predetermined threshold would be included in the recommendation list.

In order to listen to the recommendations, the user once again presses the appropriate button on their interface device or alternate selection method. Next to each recommendation, there is also a "More Like This" button that displays songs that are close matches to that particular song.

The "More Like This" ("MLT") function is implemented through a pattern-recognizing artificial intelligence system using an MLT daemon (labeled 'mltd' in FIGS. 2 and 3). The MLT function allows a user to receive music recommendations by selecting a song and requesting songs that are mathematically similar to that song. Within the implementation environment, the user needs to enter the name of a song into the device or simply click on the "More Like This" button to receive recommendations.

When the MLT function is operable, the system performs real-time MLT recommendations by looking for song files that have the most mathematically similar analysis data to the parent song. The MLT lookup process consists of searching for similar songs by checking the relative distances between all parameters for each song. It is the difference between parameters that determine if the songs are similar or not for the user. Therefore, given a list of songs, each song can have a "More Like This" link to similar music.

This is precisely the same process used to look up recommendations within the MTT function. However, instead of using the user's preferred values, the system looks at the parameter vector for the chosen song.

$$C = \sum_{p=1}^{N} (Sp - Mp)^2$$

where C is the proximity value between the song and the user's preferred values, N is the number of parameters in the parameter vector, S is the parameter vector of the songs in the database, and M is the parameter vector with the chosen "More Like This" song. Once again, only songs with a value of C below a predetermined threshold would be included in the "More Like This" list.

In addition to the MLT and MTT functions, a "My Personal Preferences" ("MPP") function enables a user to establish a personal preference file that may in turn be used by the system to provide the user with music selections that match that user's personal profile. While interacting with the device or website, a user ranks songs against preferably a simple five level scale (e.g., "I love it", "I like it", "I neither like nor dislike it", "I don't like it", and "I strongly dislike it") by choosing the appropriate option on a user interface screen. This process can be done individually for each song listened to, or by entering song names and their rankings into the device. The user can add, erase, or edit songs and rankings from their list at any time. When requested, recommendations can be made using the current songs and ratings on the list.

To do this, the parameter vectors for the MPP selected songs are weighted, based on a user's rankings, and are input to the system. This process is similar to the MTT learning process except, instead of the system deciding what it wants to learn and asking the appropriate questions, the user chooses the songs (thereby choosing the parameter vectors) and forces the system to learn from the user inputs. This is referred to as forced learning.

Selected songs are grouped based on the given rank in order to find preference groups. The selected songs fall into two types, liked songs and disliked songs. Songs ranked as "I love it", "I like it", or "I neither like nor dislike it" are defined as liked songs, and songs ranked as "I don't like it" and "I strongly dislike it" are defined as disliked songs. Similar groupings of songs is important to a successful MPP process.

Grouping is accomplished by searching through the ranked songs to find commonalities within each type (liked and disliked songs), and then grouping the songs that are most similar (i.e. close in proximity to each other). Note that a person can have more than one preference grouping within each preference group type (e.g. someone can both like slow music and hard rap music). Thus, preference groups are also referred to as musical tastes (and are also either liked or disliked).

Grouping in this way is also done to eliminate songs that are ranked by the user, but dissimilar to other songs of the same type. Songs are eliminated in this way because they are not valuable to the MPP recommendation process (i.e., the system cannot determine what it is that the user likes from that song).

Mean values are calculated for each musical taste to determine the corresponding parameter vector (referred to as a musical taste vector). To do this, songs within each musical taste are weighted according to the user's ranking for those songs, thus giving less importance to the "I like it" songs than to the "I love it" songs, but more than to the "I neither like nor dislike it" songs, for the liked musical tastes; and giving more importance to the "I strongly dislike it" than to the "I don't like it", for the disliked musical tastes. By doing this, the system biases the mean towards the more liked songs and the more disliked songs.

After the rankings have been established, the system is ready to recommend songs to the user. To do this, the system needs to create a list of possible songs to be recommended. The initial list contains all songs in the database. First, songs that are known to be disliked by the user are erased by analyzing in which relative clusters (within the whole database of songs) the disliked musical taste vectors fall (see discussion above concerning elimination of analysis data correlations). All songs from the clusters containing disliked musical taste vectors are erased from the list of possible songs to be recommended.

Using the MLT recommendation technique detailed above, recommendations are generated from the liked musical taste vectors using only the list of possible songs to be recommended. The system can either present the musical tastes found to the user (from which to select their recommendations) or simply deliver a combined recommendation list including songs from all different musical tastes.

In addition to providing such recommendation functions, both the MTT and MLT functions also create user tracking statistics in the form of log files. Such log file information is of a similar format to most daemon software and includes information as discrete calls to the recommendation engine including session number, the device requesting the action, date and time, and the outcome of the action. Every call creates a log entry and thus, unique user sessions within the Human Media Interface system can be tracked and monitored. An example log excerpt is as follows:

(HMIMData) Time 1031298303 Operation: Calculate Mean (Timer). 0.0000

(HMIMData) Time 1031298303 Operation: Calculate Standard Deviation (Timer). 0.3200

(HMIMData) Time 1031298304 Operation: Calculate Sigma (Timer). 0.3600

(HMIMData) Time 1031298304 Operation: Calculate New Song Data (Timer). 0.1300

(HMIMData) Time 1031298305 Operation: Calculate Matrix (Timer). 1.2900

(HMIMData) Time 1031298305 Operation: Calculate Used Parameters (Timer). 0.0000

(HMIMData) Time 1031298305 Operation: Resort Data (Timer). 0.0200

(IPServer) HMI TCP/IP Server. Time 1031298310 Connection No.0 New Connection Started from 192.168.0.70

(IPServer) HMI TCP/IP Server. Time 1031298310 Connection No.0 HELO 8 23

(IPServer) HMI TCP/IP Server. Time 1031298310 Connection No.0 MLTS "075678326820#1" 20

(HMIMData) Time 1031298311 Operation: More Like This (Timer). 0.1700

(IPServer) HMI TCP/IP Server. Time 1031298311 Connection No.0 QUIT (IPServer) HMI TCP/IP Server. Time 1031298311 Connection No.0 Connection Closed In this example, "HELO 8 23" gives both the third party's id number: 8 (e.g. the retailer) and the terminal id (the actual in-store device that is requesting this transaction: 23).

Anonymous user session data (not specific to an individual) can be used to determine general trends within the system and therefore is valuable from a business/marketing perspective. Examples of anonymous user session data include number of users per time period, user paths through the system, most/least recommended music, error messages, and average length of time per session.

User session information can also be attributed to an individual (e.g. John Smith logged into music kiosk #2 at 4:30 PM on Aug. 23, 2002). This can be done via the use of scanable loyalty cards or cookies in a web environment. A loyalty card (or customer card) in this case is a card-like physical identifier, such as those currently used by several retail chains and supermarkets. On arrival to a kiosk or in-store music device, the user is prompted to scan their card, thereby enabling the system to associate a specific user session to a person. Online this is done via "cookies", as is commonly used on the Internet to identify users.

Associated user session data is more robust, as various sessions from the same user can be linked together and personal information garnered. The core of this personal information includes but is not limited to personal music preferences (as deemed by the MTT and MLT functions). This is extremely useful business information for personalized sales and marketing efforts. An example of this includes presenting an individual a personalized music coupon at checkout, offering a CD from which they have already previewed in the system.

Furthermore, such personalized user session data information can be combined with other marketing databases and exported to various CRM systems, thereby enabling an even higher level of business intelligence. At this level, a retailer can use their unified CRM system to combine an individual's system-derived music preferences, select a CD to be recommended to the individual, check current inventory, determine dynamic pricing for the CD, and deliver a personalized offer via email.

Figure 4:
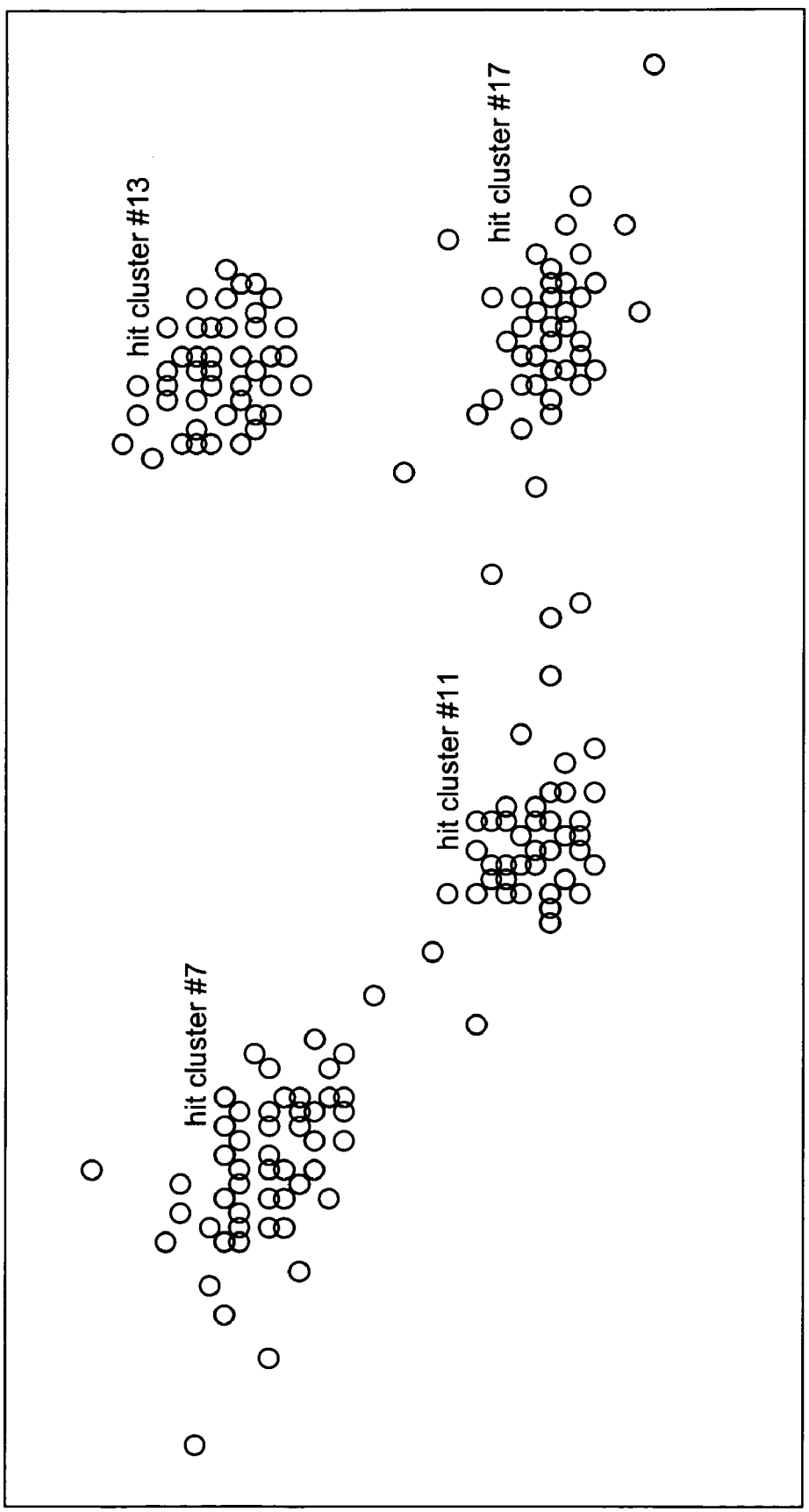
FIG. 4 is a view of a portion of the universe of analyzed songs illustrating some hit clusters.

In an alternate embodiment, the technology of the present invention can be used to predict the potential commercial success of a new song. First, a large database is analyzed to determine a song vector for each song, as described above. In the present embodiment, approximately 3.5 million songs including almost everything that has been released by the music labels since the 1950's until the present time has been anaylzed. The database is updated weekly with new releases. Each song is then mapped onto a grid called the music universe and is positioned according to its mathematical characteristics. Each song is represented by a dot on the universe and the songs on one end of the universe are vastly different from songs on the other end of the universe. Songs with mathematical similarities are positioned very close to one another. Next, all of the songs from the music universe that had not been hits in the past five years were removed. The songs remaining were grouped into a limited number of small clusters all over the universe but with vast spaces between them, as illustrated in FIG. 4.

"Hit" songs seem to have common characteristics based on the mathematical analysis. While other factors, such as lyrics, theme and artist, impact the success of a song, it is rare for a song that falls outside of the clusters to become a hit.

In this embodiment, the present invention takes the analyzed song data for the entire database and overlays extra parameters relating to the commercial success of the music in the database. These parameters may include additional data such as total sales, highest chart position, date of release, and other common indicators of commercial success. The specific weight given to such new parameters can be varied to meet an end users specific needs. Using this extra dimension, new releases, potential releases, and even unsigned acts can be compared with the database to see how well a given song fits into the current market and to identify potential hits. As the market changes, the system reflects such changes by finding new patterns in the hit clusters and applying these to the process.

The system allows for trends to be identified as they develop over time, meaning that a song that contains strong characteristics that are becoming more prevalent in new music and less of the characteristics that are diminishing can be identified as having high potential. Simply put this means that a song that sounds uncommercial to a human listening to it now may just be ahead of its time and in fact contains the right ingredients to appeal to the public sometime in the future.

For this embodiment, a database of past chart hits from either the US or the UK is used, as well as a database of "classic hits" from 1956 to the present time as the universe of hits. The "hit" database in an archive of every song that has been in the US Weekly Top 30 or the UK Official Charts for the past 5 years. Songs are weighted based upon their ranking within the Top 30. As new songs are added, old songs are deleted. This is done to keep the database as fresh as possible, effectively following the trends and styles as music changes over time.

Figure 5:
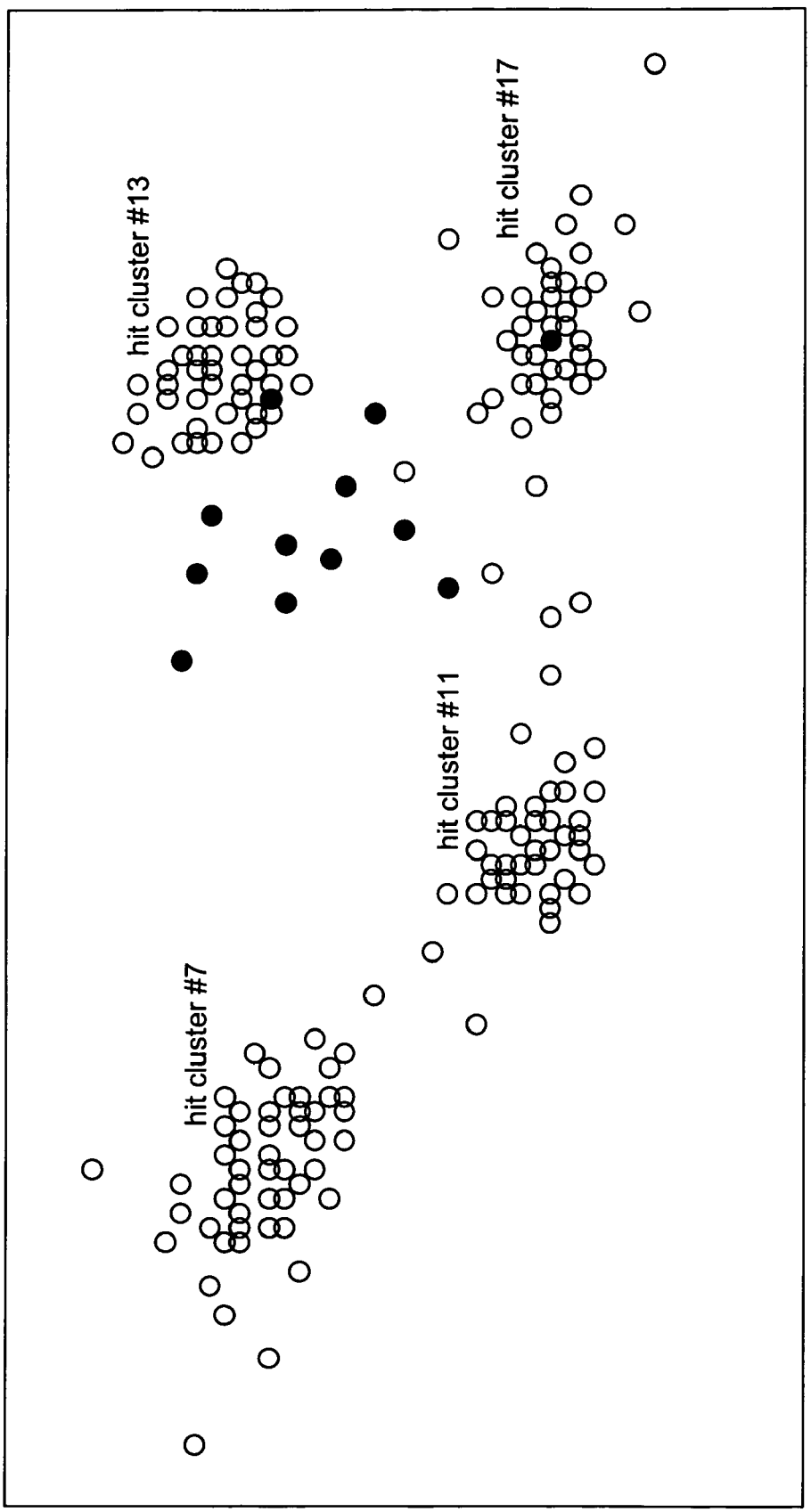
FIG. 5 is a view of a portion of the universe of analyzed songs shown in FIG. 4, with a collection of new songs superimposed thereon.

A user can submit one, or more, digital music files for analysis. The system scores a new song according to its similarities with current hit songs. First, a parameter vector is determined for the new song. The patterns in such new song are compared to patterns in recent chart "hits" and to patterns in classic hit songs going back to 1956. The new song is compared to the "hits," by comparing the new song parameter vector to the "hit" parameter vector, as described above, to obtain an affinity value for each song in the "hit" database. The affinity value is a rating that shows how closely related the mathematical patterns in one song are to another. The lower the affinity value between two songs the more closely related they are. An affinity value under 1.00 denotes close similarity while an affinity value of over 1.00 denotes similarity but less obvious and more distant similarity. (When the same recording of a song is compared against itself, the affinity value is zero.) The greater the number of past "hits" with lower affinity values to the new song, the higher the "hit" potential of the new song. FIG. 5 is an illustration of 12 new songs as analyzed and graphed on the universe of "hits". In this illustration there are two songs that fall squarely within hit clusters.

According to the new song's distance with each song in the "hit" song database and the songs within its cluster the system gives the new song a score. By measuring the new song's overall closeness to the "hits" and where such song fits into the "hit" database, an overall score is assigned to the new song. A rating of 7.00 or greater should be considered to be a very strong song and very closely related to what is currently popular in the market. In the same way, using release date and sales information for each song in the "hit" song database the system can give the new song a recentness score and a sales score. A report is provided to the user who submitted the new song indicating the overall score, the proximity to "hit" songs, and the proximity to current "hit" songs. Using such information, the user can determine an appropriate course of action for commercializing the analyzed new song.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method of analyzing music, said method comprising the steps of:
    a) providing a digital database comprising a plurality of digital song files;
    b) selecting one of said song files for analysis;
    c) dividing said selected song file into a plurality of discrete parts;
    d) using Fast Fourier Transform techniques on each part of said selected song file to establish a plurality of coefficients, wherein said coefficients are representative of predetermined quantifiable characteristics of said selected song, and;
        wherein each said predetermined characteristic is a physical parameter based on human perception including:
        brightness;
        bandwidth;
        tempo;
        volume;
        rhythm;
        low frequency
        octave, and
        how said parameters change over time:
    e) determining an average value of the coefficients for each characteristic from each said part of said selected song file;
    f) compiling a song vector comprising a sequential list of said average values of the coefficients for each said characteristic for said selected song file; and
    g) repeating steps b) through f) for each song in said database.

2. The method according to claim 1, wherein said digital database comprises a plurality of compressed digital song files, said method further comprising the step of:
    b1) decompressing said selected song file prior to dividing said selected song file into a plurality of discrete parts.

3. The method according to claim 1, wherein said digital song files are formatted as linear PCM audio data.

4. A method of determining a user's music preference, said method comprising the steps of:
    a) providing a digital database comprising a plurality of digital song files;
    b) mathematically analyzing each said digital song file to determine a numerical value for a plurality of selected quantifiable characteristics;
        wherein each said characteristic is a physical parameter based on human perception including:
        brightness;
        bandwidth;
        tempo;
        volume;
        rhythm;
        low frequency;
        noise; and
        octave, and
        how said parameters change over time;
    c) compiling a song vector comprising a sequential list of said numerical values for each of said plurality of selected characteristic for each said song file;
    d) dividing each said song file into portions of selected size and mathematically analyzing each said portion to determine a numerical value for said plurality of selected characteristics for each said portion and compiling a portion vector comprising a sequential list of numerical values for each of said plurality of characteristics for each said portion;
    e) selecting and storing a representative portion of each said song file wherein the portion vector of said representative portion substantially mathematically matches the song vector of said song file;

f) choosing two dissimilar representative portions and enabling said user to listen to both representative portions;

g) permitting said user to indicate which of said two dissimilar representative portions said user prefers; and h) repeating steps f) and g), as necessary, to establish a taste vector for said user comprising song characteristics that said user prefers.

5. The method according to claim 4, said mathematically analyzing steps further comprising the step of:
using fast Fourier Transform techniques to establish a plurality of coefficients, wherein said coefficients are representative of said characteristics of said song.

6. The method according to claim 4, further comprising the steps of:

i) normalizing and centering the data for each characteristic across the entire database to determine the most useful information from each characteristic;

j) comparing said user's taste vector to each said song vector by summing the square of the difference between the numerical values of each characteristic in each said vector; and k) recommending to said user, a list of at least one song wherein the sum of the square of the difference between the numerical value of each characteristic in each said vector is below a predetermined threshold.

7. The method according to claim 6, further comprising the steps of:

l) enabling said user to listen to a song from said list of recommended songs and permitting said user to select to listen to more songs similar to said selection;

m) comparing the song vector of said selected song to the normalized and centered song vector in the database by summing the square of the difference between the numerical values of each characteristic in each said vector; and n) recommending to said user, at least one song wherein the sum of the square of the difference between the numerical value of each characteristic in each said vector is below a predetermined threshold.

8. The method according to claim 4, wherein said method is performed using a real-time process based on dynamic, interaction with said user.

9. The method according to claim 8, wherein upon permitting said user to indicate which of two dissimilar representative portions said user prefers, said user chooses either which portion is liked best or which portion is disliked least;
then, according to said user's preference selection based on the portions presented to the user, selecting the next set of representative portions to present to the user in a dynamic manner; and
said step of establishing a taste vector for said user further comprising the steps of:
continuing to present sets of representative portions of songs until a learning process is completed and a profile of user taste can be established for recommendation of songs according to said profile.

10. The method according to claim 8, wherein said real-time, interactive process with said user is performed over a computer network.

11. A method of determining a user's music preference, said method comprising the steps of:

a) providing a digital database comprising a plurality of digital song files;

b) providing to said user a list of a plurality of songs selected from said database;

c) permitting said user to subjectively label each song in said list of a plurality of songs according to said user's likes and dislikes;

d) analyzing said song's from said list of a plurality of songs wherein said song's having been indicated as 'liked' by said user are separately analyzed from said song's having been indicated as 'disliked' by said user, said analysis of said song's further comprising the steps of;

d1) dividing each said song into a plurality of discrete parts;

d2) using Fast Fourier Transform techniques on each part of said song to establish a plurality of coefficients, wherein each said coefficient is representative of a quantifiable characteristic of said selected song, and;
wherein each said characteristic is a physical parameter based on human perception including:
brightness;
bandwidth;
tempo;
volume;
rhythm;
low frequency:
noise; and
octave, and
how said parameters change over time;

d3) determining an average value for each coefficient from each said part of said song;

d4) compiling a song vector for each said song comprising a sequential list of said average values for each said coefficient for said selected song file; and d5) repeating steps d1) through d4) for each song in said list of a plurality of songs; and e) determining a user taste profile according to songs having been indicated as 'liked' by said user.

12. The method according to claim 11, wherein said subjective labels are selected from the group consisting of:
"I strongly like it";
"I somewhat like it";
"I neither like nor dislike it";
"I dislike it"; and
"I strongly dislike it".

13. The method according to claim 11, the step of determining a user taste profile further comprising the steps of:
compiling a user taste vector comprising a sequential list of values for each coefficient wherein each such coefficient is weighted according to said user's subjective likes and dislikes.

14. The method according to claim 13, further comprising the steps of:

f) normalizing and centering the data for each coefficient across the entire database to determine the most useful information from each characteristic coefficient;

g) comparing said user's taste vector to each said song vector by summing the square of the difference between the numerical values of each coefficient in each said vector; and h) recommending to said user, a list of at least one song wherein the sum of the square of the difference between the numerical value of each coefficient in each said vector is below a predetermined threshold.

15. The method according to claim 14, further comprising the steps of:

i) enabling said user to listen to a song from said list of recommended songs and permitting said user to select to listen to more songs similar to said selection;

j) comparing the song vector of said selected song to the song vector in the database by summing the square of the difference between the numerical values of each characteristic coefficient in each said vector; and k) recommending to said user, at least one song wherein the sum of the square of the difference between the numerical value of each characteristic coefficient in each said vector is below a predetermined threshold.

16. The method according to claim 11, wherein the steps of determining a user taste profile is performed using a real-time process based on dynamic, interaction with said user.

17. The method according to claim 16, steps of determining a user taste profile further comprising the step of:

e1) selecting and storing a representative portion of each said song file wherein said representative portion substantially mathematically matches said song file;

e2) choosing two dissimilar representative portions and enabling said user to listen to both representative portions;

e3) permitting said user to indicate which of the two dissimilar representative portions said user prefers, wherein said user chooses either which portion is liked best or which portion is disliked least;

e4) then, according to said user's preference selection based on the portions presented to the user, selecting another set of representative portions to present to the user in a dynamic manner; and e5) continuing to present sets of representative portions of songs until a learning process is completed and a profile of user taste can be established for recommendation of songs according to said profile.

18. The method according to claim 16, wherein said real-time, interactive process with said user is performed over a computer network.

19. A method of comparing a new song to previously commercially successful songs, said method comprising:

a) establishing a digital database comprising a plurality of digital song files wherein said songs have been identified as commercially successful;

b) mathematically analyzing each said digital song file to determine a numerical value for a plurality of selected Quantifiable characteristics;

wherein each said characteristic is a physical parameter based on human perception including:
brightness;
bandwidth;
tempo;
volume;
rhythm;
low frequency:
noise; and
octave, and
how said parameters change over time;

c) compiling a song vector comprising a sequential list of said numerical values for each of said plurality of selected characteristic for each said song file;

d) presenting said new song as a digital music file for comparison;

e) mathematically analyzing said new song file to determine a numerical value for the same plurality of selected quantifiable characteristics;

f) compiling a new song vector comprising a sequential list of said numerical values for each of said plurality of selected characteristic for said new song file;

g) establishing an affinity value for said new song as compared to each song vector in the database by summing the square of the difference between the numerical values of each characteristic in each said vector; and j) determining the potential for commercial success if said affinity value is below a predetermined threshold.

20. The method according to claim 19, said mathematically analyzing steps further comprising the step of:

using fast Fourier Transform techniques to establish a plurality of coefficients, wherein said coefficients are representative of said characteristics of said song.

* * * * *